April 12, 1927.                J. RAIL ET AL                1,624,433
AUTOMOBILE SIDE LIGHT
Filed Nov. 11, 1926
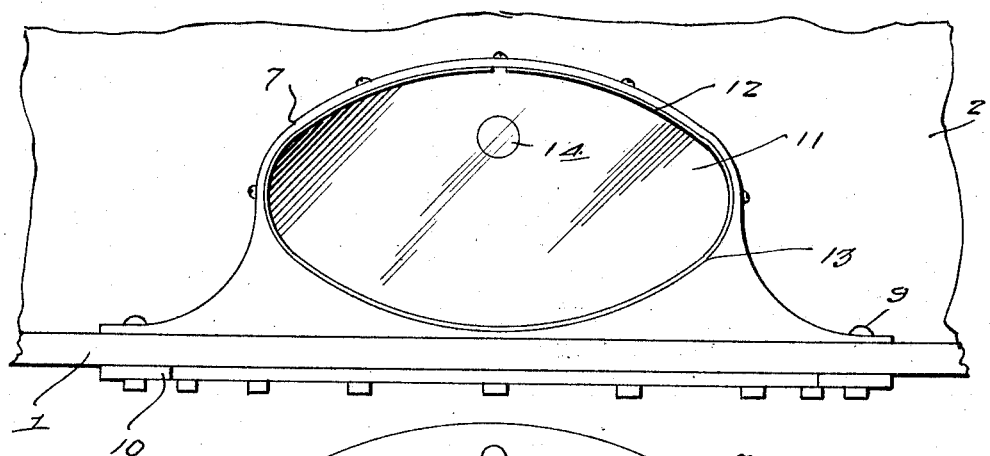
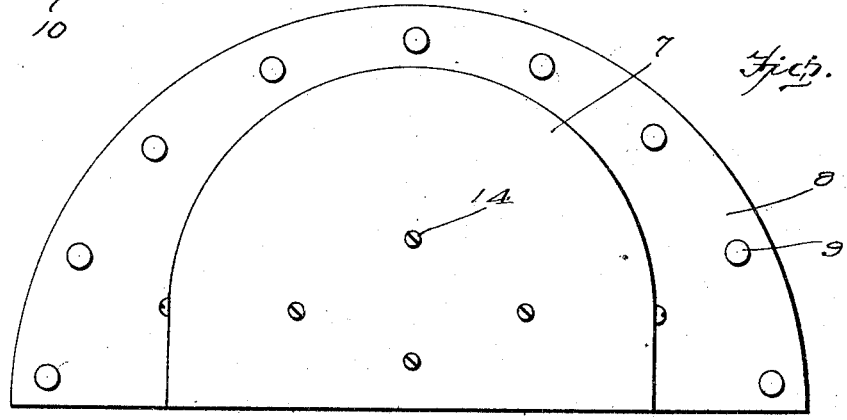
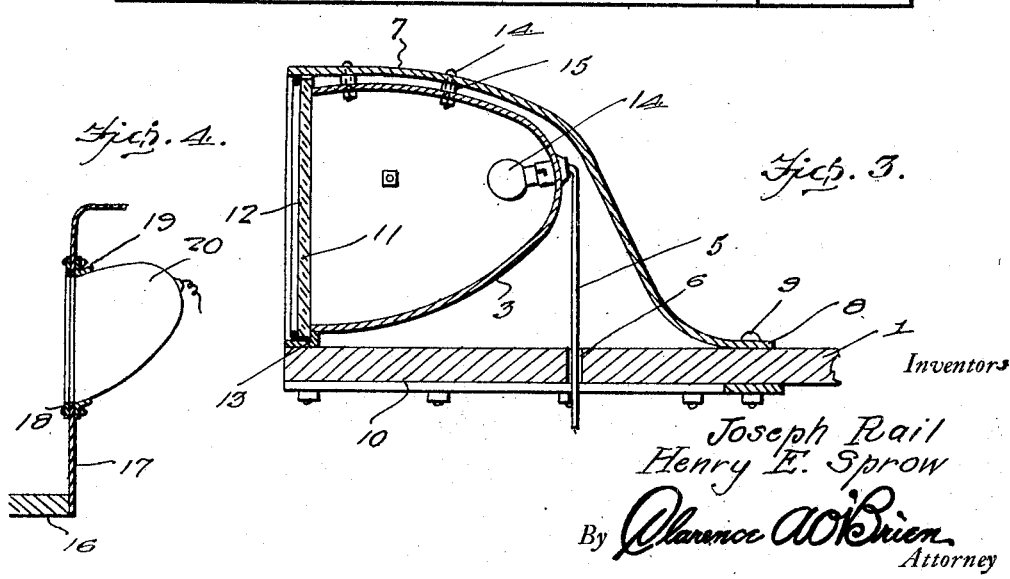
Inventors
Joseph Rail
Henry E. Sprow
By Clarence A. O'Brien
Attorney Patented Apr. 12, 1927.

1,624,433

UNITED STATES PATENT OFFICE.

JOSEPH RAIL AND HENRY E. SPROW, OF ROCKVILLE, INDIANA.

AUTOMOBILE SIDE LIGHT.

Application filed November 11, 1926. Serial No. 147,744.

This invention relates to an improved automobile light which is adapted for use on the left hand side of an automobile or similar vehicle for the purpose of projecting a beam of light onto the road surface for the purpose of illuminating the latter to aid the driver of an approaching automobile in maintaining a safe distance in order to avoid accidents.

The invention is not to be confused with adjustable flash lights or running board lamps and lights, for it is constructed with a view toward projecting a proper beam of light at a desirable distance and elevation for promoting safe driving. Stated in another way, the invention is directed to an auxiliary side light located slightly above the plane of the running board to be employed as a "courtesy light", and to be employed more or less as a favor to approaching vehicle drivers.

As the invention may be carried out through the employment of a variation of structural details, the structural features will not be mentioned here, but will be made clear by reading the following detailed description in connection with the accompanying drawings.

In the accompanying drawings forming a part of this application, and in which like numerals are employed to designate like parts throughout the same:—

Figure 1 is a side elevation showing the preferred embodiment of the invention.

Fig. 2 is a top plan view of the same removed from the running board.

Fig. 3 is a central transverse section showing the structure more in detail.

Fig. 4 is a slightly enlarged embodiment of the invention.

In the drawings, the reference character 1 designates a portion of the running board, the reference character 2 designates a portion of the fender shield. These parts of course, are of conventional design, and in the embodiment of the invention represented in Figs. 1 to 3 inclusive, the same is in the form of an attachment to be applied without requiring alterations of the existing parts.

The invention comprises a reflector 3 having the configuration of an elliptical cupola. The reflector is built in this particular shape in order to throw the light rays as far as possible transversely of the line of travel. The vertex of the cupola is disposed slightly higher than the horizontal center, to give the reflector a slight downward tilt to throw the beam downwardly on the road.

Supported on the interior of the reflector at the approximate elevation indicated in the drawings, is the electric bulb 4 to which an electric conductor 5 leads. In this connection, it might be stated that the running board is of course formed with a vertical hole 6 for passage of the conductor, and a suitable switch is employed within convenient reach of the driver to turn the light "off" and "on" as conditions require.

Enclosing the reflector, is a housing, the upper portion 7 of which corresponds somewhat in shape to the reflector, and the lower portion merges into an attaching flange 8 which is secured by bolts 9 to the running board. Here we might call attention to a substantially semi-elliptical strip 10 arranged on the under side of the running board to make for rigidity in connection of the device to the running board. The open side of the reflector is of course provided with a lens 11 of elliptical configuration and constructed of an appropriate texture of glass. The lens 11 is held in place by a resilient retaining wire or its equivalent 12.

Moreover, it will be noticed that in this embodiment of the invention, the outer edge portion of the housing extends beyond and overhangs the lens and the retaining wire. Then too, the lower portion of the casing is fashioned as at 13 to provide a channel providing a seat for reception of the lens and wire. We would also call attention to the provision of bolts 14 and of spacing members 15 interposed between the housing and the reflector for maintaining the reflector firmly in place.

Attention is now invited to Fig. 4, wherein the reference character 16 designates the running board and 17 the customary shield which in this instance is formed with an opening around which is an elliptical frame 18. On the inside, and bolted to the frame and shield is a correspondingly shaped angle retainer 19 with which the auxiliary light 20 is connected.

From the foregoing description and drawings, it will be seen that we have evolved and produced an exceptionally novel, simple and inexpensive, and proficient auxiliary side light for automobiles and other forms of vehicles which may be used to a decided advantage to aid in safe driving.

When properly proportioned and located, it will form a fan-shaped beam which will spread over a considerable area of the road surface for efficiently illuminating the same to render it clearly visible and to show the lines of demarkation of the vehicle and the edge of the road. Thus, when the driver of an approaching vehicle has his light dimmed, and is possibly blinded by the bright lights of the passing machine, the latter being equipped with the auxiliary light, will permit the blinded driver to approach with caution and to pass the machine safely.

With this advantage of the ordinary lighting system, it is well known to those skilled in the art to which the invention relates and hence, this improvement will be appreciated and clearly understood. Therefore, a more lengthy description is thought unnecessary.

While the preferred embodiment of the invention has been shown, it is to be understood that minor changes coming within the field of invention claimed may be resorted to if desired.

Having thus described our invention, what we claim as new is:—

In a side light structure of the class described, in combination, a running board, a substantially elliptical reflector, a source of illumination supported on the interior of the reflector on a plane above the horizontal center of the reflector, a housing in which said reflector is located, said housing having a portion shaped to conform to a part of the reflector, and having another portion shaped to provide an attaching flange secured to said running board, a lens for the open side of the said reflector located in said housing, and a retaining wire for said lens, together with means for supporting said reflector in an inclined position in said housing.

In testimony whereof we affix our signatures.

JOSEPH RAIL.
HENRY E. SPROW.